G. W. JACKSON.
EXCAVATING AND LOADING MACHINE.
APPLICATION FILED MAR. 27, 1911.

1,046,300.

Patented Dec. 3, 1912.
7 SHEETS—SHEET 1.

WITNESSES
Harry S. Gaither
William Goldberger

INVENTOR
George W. Jackson
By William B. Hoce
Atty

Fig. 3.

G. W. JACKSON.
EXCAVATING AND LOADING MACHINE.
APPLICATION FILED MAR. 27, 1911.

1,046,300.

Patented Dec. 3, 1912.
7 SHEETS—SHEET 5.

G. W. JACKSON.
EXCAVATING AND LOADING MACHINE.
APPLICATION FILED MAR. 27, 1911.

1,046,300.

Patented Dec. 3, 1912.
7 SHEETS—SHEET 6.

WITNESSES

INVENTOR
George W. Jackson
by William L. Hall
Atty

G. W. JACKSON.
EXCAVATING AND LOADING MACHINE.
APPLICATION FILED MAR. 27, 1911.

1,046,300.

Patented Dec. 3, 1912.
7 SHEETS—SHEET 7.

UNITED STATES PATENT OFFICE.

GEORGE W. JACKSON, OF CHICAGO, ILLINOIS, ASSIGNOR, BY MESNE ASSIGNMENTS, TO GEORGE W. JACKSON MANUFACTURING COMPANY, OF CHICAGO, ILLINOIS, A CORPORATION OF ILLINOIS.

EXCAVATING AND LOADING MACHINE.

1,046,300.  Specification of Letters Patent.  Patented Dec. 3, 1912.

Application filed March 27, 1911. Serial No. 617,050.

*To all whom it may concern:*

Be it known that I, GEORGE W. JACKSON, a citizen of the United States, and a resident of Chicago, in the county of Cook and State of Illinois, have invented certain new and useful Improvements in Excavating and Loading Machines; and I do hereby declare that the following is a full, clear, and exact description thereof, reference being had to the accompanying drawings, and to the characters of reference marked thereon, which form a part of this specification.

This invention relates to improvements in excavating and loading machines of the boom type in which a rising and falling boom, which carries an endless series of buckets, is mounted on a turn table that is pivotally supported on a truck, whereby the boom may be adjusted through a wide vertical and horizontal range of action.

The machine herein illustrated is in some respects like that illustrated in my prior application for United States Letters Patent, Serial Number 499,527, filed June 1st, 1909.
Such machines are particularly adaptable for use in excavating tunnels in rock to pick up the loose rock after the blasts and to load the same into cars, but may be employed to handle other loose materials.
Among the objects of the invention is to provide a novel means of pivoting the boom to the turn table arranged to simplify the construction of the machine and to render the same exceedingly rigid.
A further object of the invention is to provide means for locking the boom from swinging laterally when disconnected from the motor which operates it, and also for locking the traction mechanism when disconnected from the motor to prevent the motor driven truck from being rolled backwardly in case the buckets at the forward end of the boom should meet with an unusual resistance.
A further object of the invention is to so arrange the locking devices that the locking devices for the boom swinging and traction mechanisms will be automatically set upon the disconnection of the motor from the said mechanisms.

The invention has for its object other improvements designed to simplify and to render the machine more efficient, and the invention consists in the matters hereinafter set forth and more particularly pointed out in the appended claims.

The truck 20 is provided with rear traction wheels 21, 21 and front steering wheels 22, 22, the stub axles of the latter of which are pivoted to the brackets 23 of the truck (Fig. 3) and may be connected by any familiar form of steering apparatus, such, for instance, like that shown in my aforesaid prior application.

Figure 11:
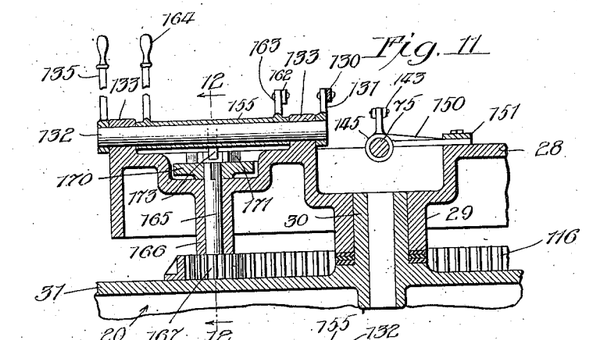
Fig. 11 is a detail section on the line 11—11 of Fig. 3.

Supported on the truck to turn or rotate thereon is a turn table 28, the same being centrally pivoted to the truck, as by a bearing sleeve 29 (Figs. 4 and 11) rotatively mounted on an upstanding hollow stud 30 shown as made integral with the top plate 31 of the truck 20. The turn table is supported on the truck through the medium of trunnion rollers 33 which rest and roll on an annular raised track 34 formed on the upper face of the truck, concentric with the turn table pivot.

Figure 5:
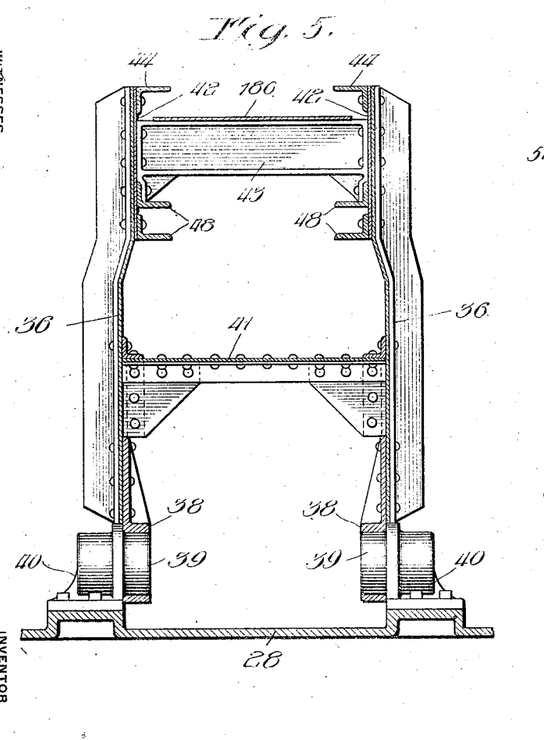
Fig. 5 is a vertical section on the line 5—5 of Fig. 1.
Figure 6:
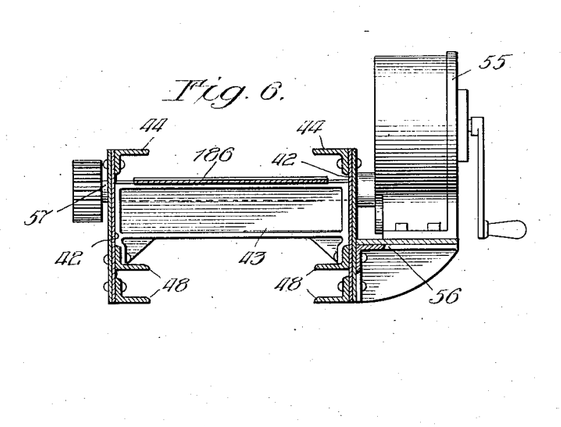
Fig. 6 is a cross section on the line 6—6 of Fig. 4.
Figure 7:
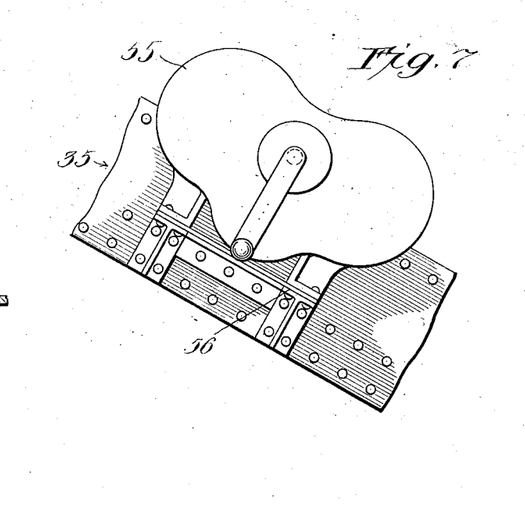
Fig. 7 is a detail side elevation of the boom, showing mounted thereon a motor for operating the bucket chains.

35 designates a boom that is pivotally mounted between its ends on the turn table in rear of the central pivot of the latter. Said boom is pivotally connected at a point between its ends to the turn table through the medium of laterally separated legs 36, 36, made up of flanged or ribbed metal plates that are riveted or otherwise fixedly attached at their upper ends to the sides of the boom, and are provided at their lower ends with bearing eyes 38 which engage over pivot studs 39, 39 formed on brackets 40 which are attached to and rise from the turn table 28 at the opposite sides thereof. Said boom supporting legs are stiffened or strengthened between their ends by the built up transverse stiffening members 41, 41 attached to the legs in the manner shown in Figs. 4 and 5. The boom 35 comprises laterally separated vertical plates 42, 42 connected by the transverse I-beam struts 43, Figs. 4, 5 and 6. Said plates are provided at their upper edges with the flanged bars 44, 44 that stiffen the plates and support the upper lap of the chains 45, 45 that carry the buckets 46, 46. Said side members of the boom are each provided at the lower edge thereof with upper and lower parallel flanged bars 48, 48, the lower one of which constitutes a track to support the lower lap of the bucket chains or belts and the pairs of bars constituting guides for said lower laps of the bucket chains. The said bucket chains or belts have incorporated therein rollers 50, 50 which rest and roll on the tracks constituted by said angle bars 44 and 48, and said chains may be connected to the buckets by the studs 51, 51 upon which certain of the rollers 50 are mounted. The bucket chains are trained at the forward and rear ends of the boom over sprocket pulleys 53 and 54, respectively, which are suitably supported on shafts mounted in the side members or plates of the boom. The sprocket chains and buckets are given movement through the medium of a motor 55 that is mounted on a bracket 56 attached to one side of the boom. The motor consists, as herein shown, of an air motor the shaft 57 of which is connected by the train of gears shown in Figs. 1 and 2 to the shaft 58 of the rear sprocket or belt wheel.

Figure 1:
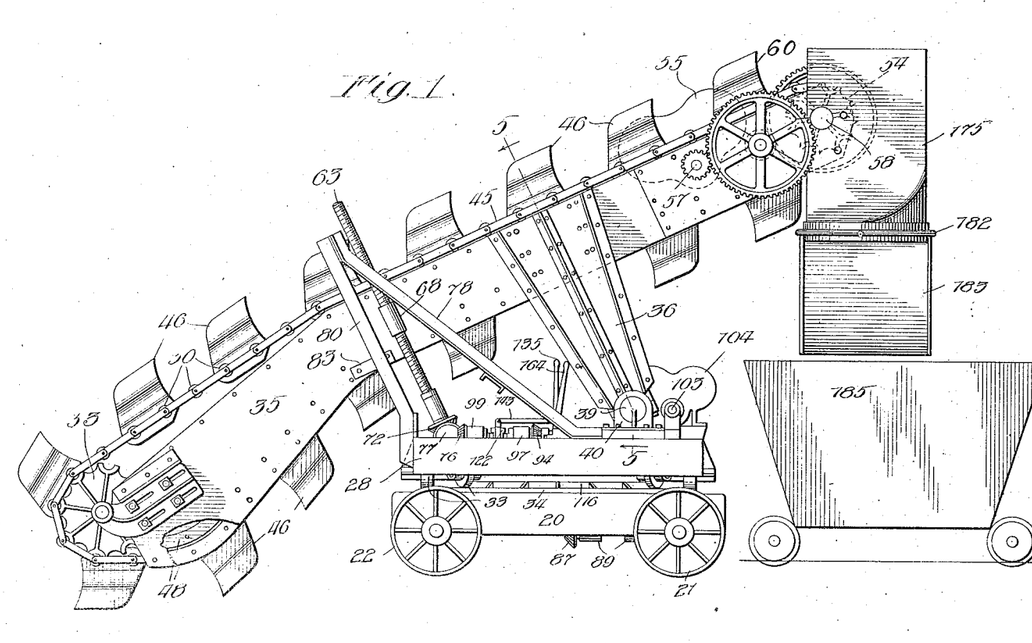
—Figure 1 is a side elevation of the machine embodying my invention.
Figure 2:
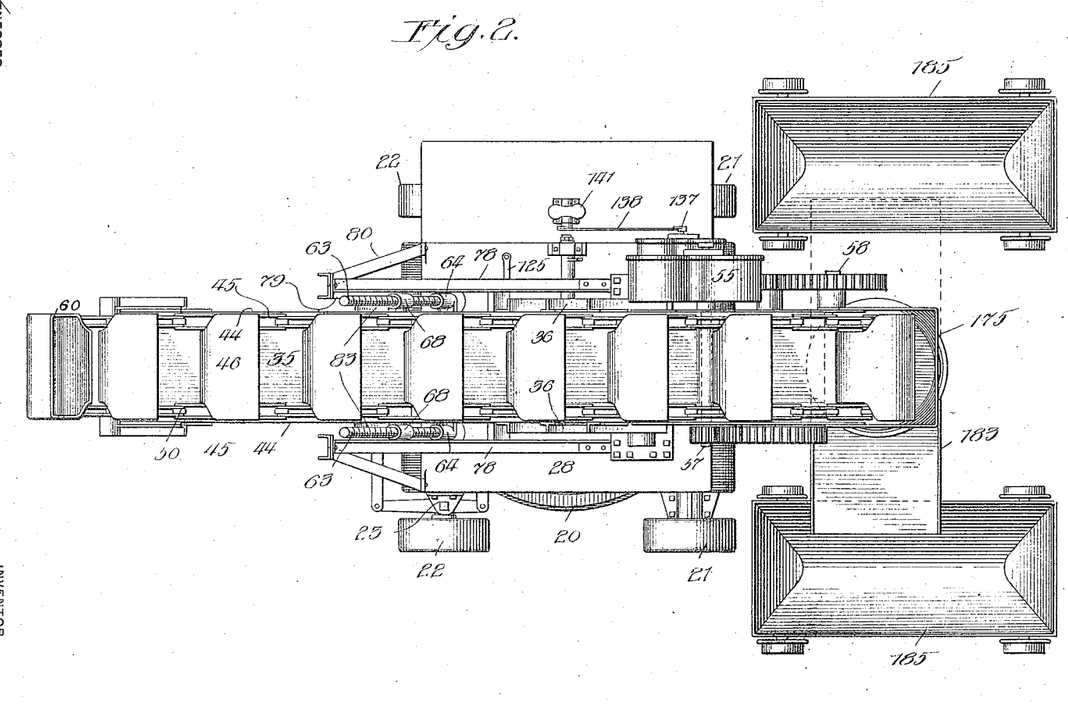
Fig. 2 is a top plan view thereof.
Figure 8:
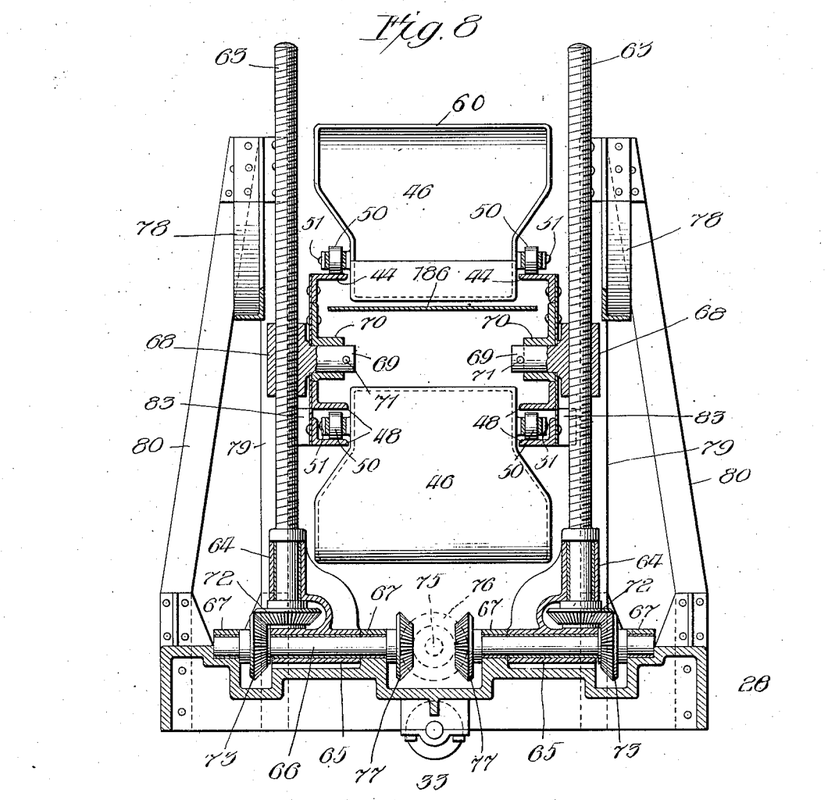
Fig. 8 is a vertical section on the line 8—8 of Fig. 4.
Figure 9:
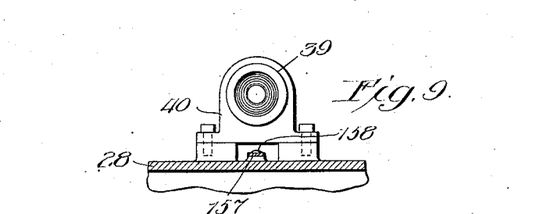
Fig. 9 is a detail section on the line 9—9 of Fig. 3.
Figure 10:
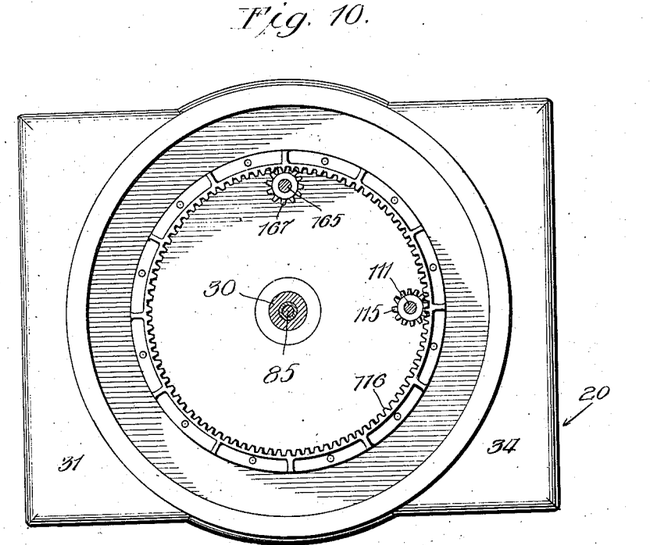
Fig. 10 is a horizontal section on the line 10—10 of Fig. 4.

The lower laps of the bucket chains are guided between the flanged bars 48 and said flanges extend entirely to the front end of the boom, as shown best in Fig. 1, whereby the lower chains are supported entirely to the front end of the boom so as to brace the lower series of buckets and to positively hold them up against the work. The upper flanged bars 44 support the principal parts of the upper laps of the bucket chains. The forward ends or mouths 60 of the buckets 46 are flared or widened, as best shown in Figs. 2 and 8, the widened portions of the buckets extending laterally beyond the chains and being as wide as the over-all width of the boom. This construction avoids contact of the front end of the boom with rocks or like material in a manner tending to laterally deflect the boom, and insures that the material will be picked up by the buckets.

Figure 3:
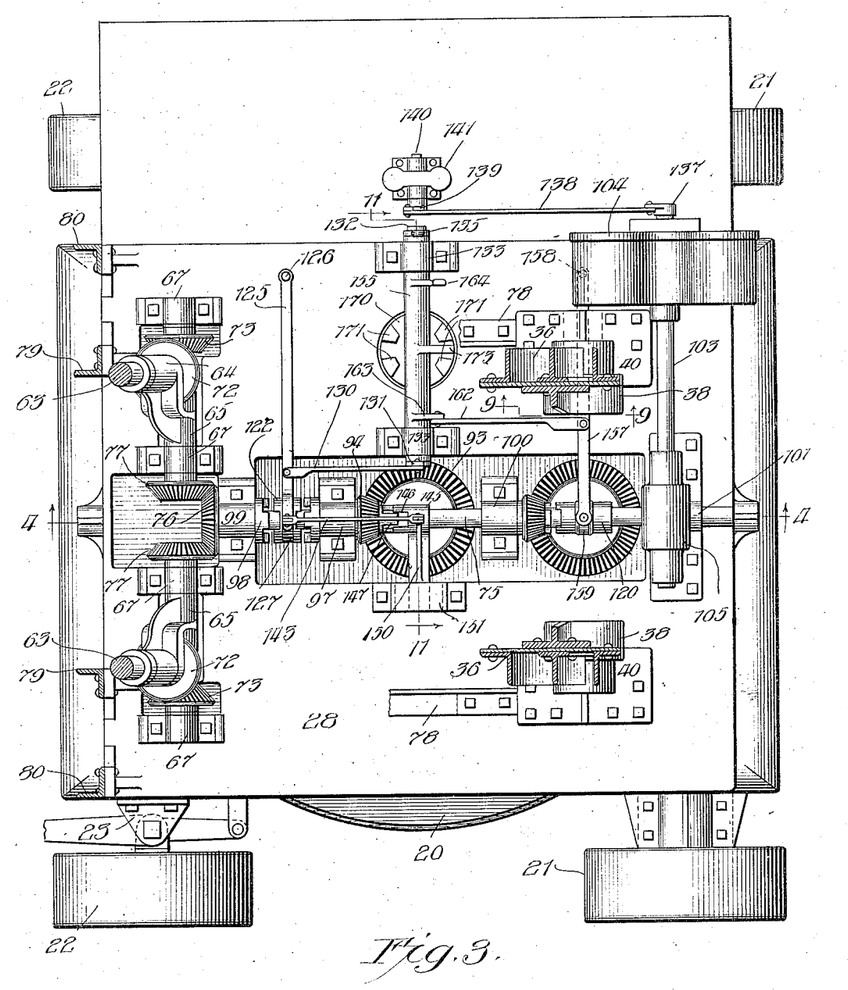
Fig. 3 is a horizontal section on the line 3—3 of Fig. 4.

The boom is raised and lowered about its pivots 39 by means of screw-threaded raising and lowering shafts 63, 63 at the forward end of the turn table which are mounted in bearings 64, 64 that are made integral with sleeves 65, 65 that are mounted on horizontal, transversely arranged shafts 66, 66 which are rotatively mounted in bearings on the front end of the turn table 28, as best shown in Figs. 3 and 8. The said screw-threaded shafts 63, 63 extend through and have screw-threaded engagement with sleeves or nuts 68, 68 which are provided with trunnions 69, 69 that extend through the side members of the boom and are rotatively engaged with bearing bosses 70, 70 thereon, whereby the said screw-threaded shafts have swiveling connection with the boom. The sleeves or nuts are held in place by the pins 71 which extend through the trunnions thereof inside the bearing bosses 70. The said raising and lowering shafts 63 are provided at their lower ends with beveled gears 72, 72 which mesh with other beveled gears 73, 73 on the shafts 66 whereby, upon rotation of the latter shafts, the said screws 63 are turned in the nuts or sleeves 68 to raise or lower the boom. The shafts 66, 66 are rotated through the medium of a horizontal operating shaft 75 which extends fore and aft of the turn table and is provided with a beveled gear 76 that meshes with a pair of beveled gears 77, 77 mounted on and fixed to the inner ends of said shafts 66. The said shaft 75 is operated from a motor carried by the turn table in a manner hereinafter to be more fully described.

The swinging boom is braced from lateral deflection during its rising and falling movements and during the operation of the machine, by means of the brace frames consisting of the forwardly and obliquely extending members 78, 78 fixed at their lower ends to the turn table at the sides of the boom, and the upright members 79, and the laterally oblique members 80 fixed to the forward side or edge of the turn table (Figs. 1, 3 and 4) and rigidly connected at their upper ends to each other and the brace member 78 at points above the boom. The inner members 79 of the guide frames thus constructed are arranged closely adjacent to the sides of the boom or to cheek blocks 83, 83 on the side members of the boom, as shown in Figs. 1, 2 and 8, so as to thereby prevent the boom from swerving under lateral pressure or stress. The brace and guide frames also avoid twisting action on the boom pivot studs and bearings due to such lateral pressure or stress.

I now desire to call attention to the fact that the boom inclines upwardly and rearwardly over the turn table to afford sufficient room below the rear end of the boom for a discharging spout hereinafter to be referred to, and a car to receive the matter dumped from the spout. In tunnels, however, the overhead room is invariably limited, and for this reason the distance between the forward end of the turn table and the lower margins of the boom has been reduced in the present construction, to a minimum; and to bring the forward end of the boom as close as possible to the forward end of the turn table, I form in the sideplates of the boom, a downwardly-turned bend or kink, as shown in Fig. 1, which results in the saving of considerable space which the machine would occupy were the boom extended in a straight line with the middle and rear portions of said boom.

Figure 4:
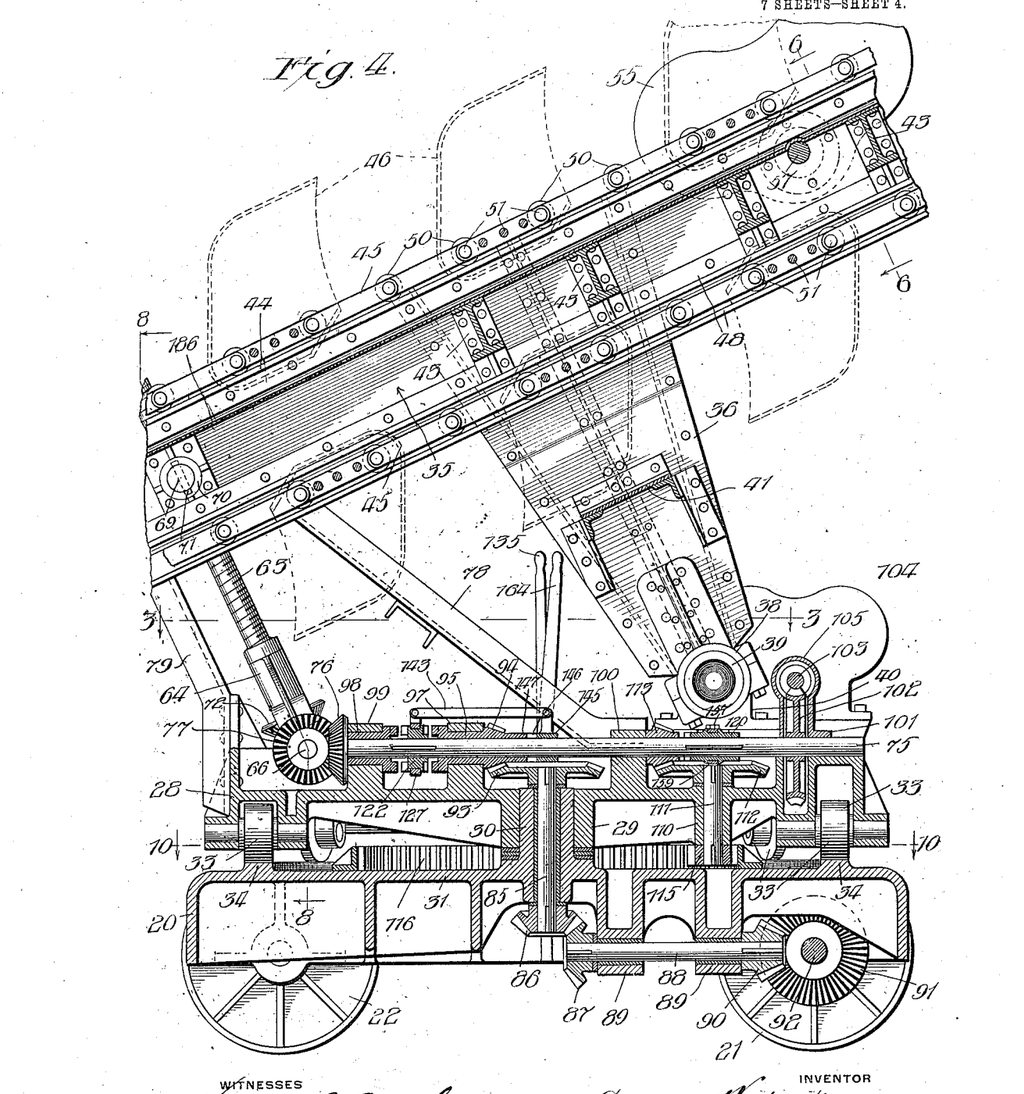
Fig. 4 is a transverse section on the line 4—4 of Fig. 3.

Referring now to the mechanism for advancing the truck under the power of its motor, and for raising and lowering the boom, and to the manner of mounting the turn table 28 on the truck 20, and the mechanism for swinging the turn table on the truck to swing the boom horizontally, said parts are made as follows:—Rotatively mounted in the hollow trunnion 30 on which the downwardly extending sleeve or boss 29 of the platform is rotatively mounted is a vertical shaft 85 that is provided at its lower end with a beveled pinion 86 (Fig. 4) which meshes with a beveled pinion 87 that is fixed to the forward end of a horizontal shaft 88 which is mounted in bearings 89, 89 on the truck, and is provided at its rear end with a fixed beveled pinion 90 which meshes with a beveled gear wheel 91 on the shaft 92 of the rear traction wheels 21. To the upper end of shaft 85 is fixed a horizontal beveled gear wheel 93 which meshes with a beveled pinion 94 formed on a sleeve 95 that loosely surrounds the shaft 75 before referred to and which itself is rotatively mounted in a bearing 97 that rises from the turn table. Loosely mounted on the front end of said operating shaft 75 is a sleeve 98 which carries the beveled gear wheel 76 of the boom raising and lowering mechanism, and which is rotatively mounted in a bearing 99 which rises from the forward end of the turn table. The operating shaft is also mounted in rear of the vertical traction drive shaft 85 in bearings 100 and 101 which rise from the turn table. To the rear end of the shaft 75 is fixed a worm wheel 102 that meshes with a worm carried by the shaft 103 of a motor 104 that is mounted on the rear end of the turn table at the right hand side thereof. Said motor may be of any preferable type, but when used in tunnel work where compressed air is employed to operate the drills, the motor will desirably be an air motor. The worm wheel and gear are covered by a suitable casing 105 in which is formed the rear bearing 101 of the operating shaft 75. Mounted in a vertical bearing 110 near the rear end of the turn table is a vertical shaft 111, (Fig. 4) to the upper end of which is fixed a horizontal beveled gear wheel 112 that meshes with a pinion 113 which is loosely mounted on the operating shaft 75. Fixed to the lower end of said shaft 111 is a pinion 115 which meshes with an internally toothed circular rack 116 that is fixed to and rises from the truck, said rack being concentric with the turn table pivot. The beveled pinion 113 is adapted to be locked to the shaft 75 by a clutch sleeve 120 splined to and slidable endwise of the shaft 75 and provided with clutch teeth or jaws to engage in like teeth or jaws on the adjacent end of the pinion 113. Both of the sleeves 95 and 98 which, respectively, carry the pinions 94 and 76, are shown as adapted to be separately clutched to the main operating shaft 75 by means of a single clutch collar 122 splined to and slidable on the shaft 75, and provided at its opposite ends with clutch teeth or jaws to engage the similarly formed clutch teeth or jaws on the adjacent ends of said sleeves 95 and 98, as best shown in Figs. 3 and 4.

Referring now to the manner in which the several mechanisms are controlled to move the truck on its wheels, to turn the turn table on its pivot and to raise and lower the boom, the parts are made as follows:—The clutch collar 122 is loosely connected to one end of a horizontal lever 125 that is pivoted at 126 to the turn table and is suitably connected at its inner end with a sleeve 127 which occupies an exterior annular groove in said clutch collar. Pivotally connected at one end to the lever 125 is a link 130, which latter is pivoted at its other end to the crank arm 131 (Figs. 3 and 11) of a rock shaft 132 that is mounted in bearings 133 at one side of the turn table. Fixed to the outer end of the rock shaft 132 is a hand lever 135. By rocking said shaft 132 in one direction the clutch collar 122 is shifted on the shaft 75 to bring one set of its clutch teeth or jaws into engagement with the clutch teeth or jaws of the beveled gear wheel 76 thereby locking said gear wheel to the shaft 75 and rotating, through the medium of the shafts 66, 66, the screw-threaded boom raising and lowering shafts 63 to raise or lower said boom. The direction in which the boom will be thus swung on its pivot will depend upon the direction of rotation of the motor 104. The valve controlling lever 137 of said motor 104 is connected by a link 138 to the crank arm 139 of a short rock shaft 140 that has thereon a double ended foot piece or treadle 141, whereby the said valve lever may be swung in either direction to drive the motor forwardly or rearwardly. The swinging end 127 of the lever 125 is connected by a link 143 with a sleeve 145 that is slidable on the main operating shaft 75 just in rear of the beveled pinion 94 that communicates traction power to the traction wheels 21. The said sleeve 145 is provided with relatively long, angularly spaced teeth or jaws 146 that are adapted to engage like spaced teeth or jaws 147 on the adjacent end of the sleeve 95 which carries said pinion 94. The locking sleeve 145 is held non-rotative on the shaft 75 by means of a laterally extending arm 150, (Figs. 3 and 11) the outer end of which engages beneath a guide plate 151 that is bolted or otherwise fixed to the upper face of the turn table, the said guide plate being recessed to permit movement of said arm relatively to the guide plate, as indicated in dotted lines in Fig. 3. The said intermeshing teeth or jaws 146, 147 are of such length as to remain engaged when the clutch collar 122 is in its neutral position and also when it is in its forward position to connect the shaft 75 with the raising and lowering boom shafts 63, and said teeth or jaws act at this time to lock the pinion 94 and the traction gear so as to prevent the truck from moving on its wheels when power is applied to raise or lower the boom. When the clutch sleeve 122 is shifted rearwardly to lock the sleeve 95 which carries the pinion 94 to the operating shaft, and thereby connect the motor to the traction wheels to move the truck backwardly or forwardly, the intermeshing teeth or jaws of the collar 145 and the sleeve 95 are disengaged to permit the pinion 94 to turn with the operating shaft 75 and thereby operate the traction mechanism. It will thus be seen that when the clutch collar 122 is released from the sleeve 95 to release the traction gear from the operating shaft, the said traction gear is automatically locked fixed or stationary by engagement of the teeth 146 of the locking sleeve 145 with said sleeve 95, and that when the traction gear is connected, through the clutch sleeve 122 and sleeve 95 with the operating shaft, the traction locking device is automatically released.

By reason of the screw-threaded engagement of the boom raising and lowering shafts 63 with the nuts 68 on said boom, the said boom is automatically locked at a given elevation when power is disconnected therefrom, thereby avoiding the necessity of providing special locking means therefor to hold the boom at a desired elevation when power is disconnected therefrom.

Figure 12:
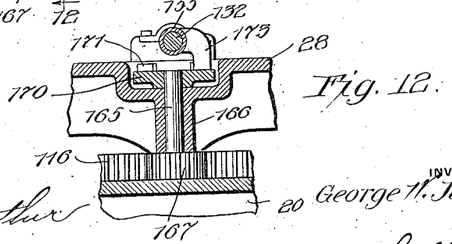
Fig. 12 is a detail vertical section on the line 12—12 of Fig. 11.

The clutch sleeve 120 by which the operating shaft 75 is connected to the beveled pinion 113 of the turn table operating gear is controlled by connection with a hollow rock shaft 155 that is rotatively mounted on the rock shaft 132 before referred to, said parts being made as follows:—157 designates a horizontally swinging lever that is pivoted at one end at 158 to the turn table and is forked at its other end to afford loose connection with a ring 159 that is loosely mounted about the clutch sleeve 120. The said lever 157 is connected by a link 162 to a crank arm 163 on the inner end of the hollow rock shaft 155, and said rock shaft is provided at its outer end with a hand lever 164 by which to operate the same. When the hand lever is swung forwardly the clutch sleeve 120 is engaged with the beveled pinion 113 to lock the latter to the shaft and to connect the motor to the turn table operating mechanism in a manner to rotate the turn table and to swing the boom horizontally. The said controlling means for the turn table operating mechanism is provided with locking means by which to lock the turn table from rotation simultaneously with the disconnection of the motor from the turn table operating mechanism. The construction herein shown for effecting this result is made as follows:—165, Figs. 11 and 12, designates a short vertical shaft that is rotatively mounted in a bearing 166 at one side of the turn table and is provided at its lower end with a pinion 167 which meshes with the internally toothed rack 116. The shaft 165 has fixed to its upper end a horizontal disk 170 that is contained within a recess at the upper side of the turn table, and said disk is formed at its upper side with a plurality of angularly spaced lugs 171, 171, as shown also in Fig. 3, forming between them angularly spaced notches. The disk 170 is located below the rock shaft 155 and said rock shaft is provided with a fixed locking dog 173 which extends laterally and downwardly therefrom in position to enter the notches between said lugs 171. When the rock shaft 155 is rocked forwardly to throw the clutch sleeve 120 into engagement with the beveled pinion 113 to connect the motor to the turn table operating mechanism, said locking dog is thrown upwardly above the plane of the lugs 171 so that the shaft 165 is free to rotate in its bearing, and will rotate freely when the turn table and its rock shaft turns or rotates. When the parts are reversed to disconnect the motor from the turn table operating mechanism, the said dog 173 is swung downwardly into one of the notches between the lugs 171 and thereby locks the shaft 165 and its pinion 167 from rotation and, by reason of the meshing of the pinion thus fixed with the rack on the turn table, said turn table is locked from rotation.

The material is dumped from the buckets at the rear end of the boom into a hopper 175 fixed to the rear side of the boom. This hopper is provided with a discharge spout or chute 183, secured to said hopper by a swivel-connection 182 whereby said chute may be turned in any direction desired to carry the material delivered into the hopper to cars 185 located in rear or at the side of the rear end of the machine, as indicated in Figs. 1 and 2.

In order to prevent loose material carried upwardly along the boom by the buckets from falling out of the buckets and through the boom, I may provide at the top of the boom a plate 186 which extends longitudinally from the front to the rear end of the boom beneath the level of the buckets on the upper lap of the chain, as shown in Figs. 1, 4, 5, 6 and 8. Said plate may be attached to the cross struts or braces 43 of the boom. In case any of the material should fall out of the buckets and lodge on said plate it will be caught by the buckets which are spaced closely thereto, and carried to the rear upper end of the boom and discharged into the hopper at the rear of the boom.

The construction described permits all the operations of the machine to be controlled from one side of the machine by the use of the pedal 141 two hand levers 135 and 173, and each mechanism is automatically locked from movement when the power is disconnected therefrom, so that the front or receiving end of the boom may be reliably held at all times in the work. The provision of the boom carrying legs 36, attached between the ends of the boom, for pivoting the boom to the turn table constitutes an exceedingly effective and inexpensive method of connecting the boom to the turn table, and this construction also enables a portion of the weight of the forward end of the boom to be counterbalanced so as to thereby require less power to raise and lower the boom and requires a lighter constructed raising and lowering mechanism than if the boom be pivoted at its extreme rear end.

It will be obvious that the structural details of the invention described may be varied within the spirit and scope of the invention, and the invention is not limited to the illustrated details except as imposed by the prior art.

I claim as my invention:—

1. An excavating and loading machine comprising a wheeled truck, a turn table pivoted centrally thereof to the truck and provided with means for turning it on its pivot, a vertically swinging boom over the turn table provided between its ends with members which are fixed to the sides of the boom and extend downwardly therefrom, means for pivoting the lower ends of said members directly to the turn table, an endless series of traveling buckets mounted on the boom with means to move them along the boom, and guiding and bracing means for the boom fixed rigidly to the turn table and extending upwardly therefrom at the sides of the boom.

2. An excavating and loading machine comprising a wheeled truck, a turn table pivoted centrally thereof to the truck and provided with means for turning it on its pivot, a vertically swinging boom over the turn table provided between its ends with members which are fixed to the sides of the boom and extending downwardly therefrom, means for pivoting the lower ends of said members directly to the turn table, an endless series of traveling buckets mounted on the boom with means to move them along the boom, and guiding and bracing frames at the sides of the boom each comprising a forwardly and upwardly extending member which is attached at its lower end to the upper side of the turn table, and an inner vertical and an outer laterally oblique member attached to the front of the turn table, the members of each frame being rigidly fixed together at their upper ends.

3. An excavating and loading machine comprising a wheeled truck with traction means for moving the same on its wheels, a horizontally and vertically swinging boom supported on the truck, with means for swinging it horizontally and vertically, an endless series of traveling buckets supported on the boom, with means for giving said buckets movement along the boom, a motor, a clutch device for connecting the motor with the truck traction means, and locking means operatively connected to and movable with said clutch device and operable upon the releasing movement of the clutch device from the traction means to lock the traction means inoperative.

4. An excavating and loading machine comprising a truck having traction and steering wheels, a horizontally and vertically swinging boom supported on the truck, with means for swinging it horizontally and vertically, a motor, a horizontally arranged operating shaft, mechanism for connecting the motor to the operating shaft, a vertical shaft geared to the traction wheels of the truck and provided at its upper end with a gear wheel, a sleeve loosely mounted on said operating shaft and having a pinion which meshes with said gear wheel, a clutch collar splined to the operating shaft for connecting the operating shaft with said pinion sleeve, a locking ring slidable and non-rotative on the operating shaft and having means to interlock it with said pinion sleeve and a connection between said locking ring and the clutch collar.

5. An excavating and loading machine comprising a truck having traction and steering wheels, a horizontally and vertically swinging boom supported on the truck, a motor, a horizontally arranged operating shaft, mechanism for connecting the motor with the operating shaft, traction means adapted to be connected to the operating shaft, raising and lowering means for the boom adapted for connection with the operating shaft, and a single clutch device adapted to alternately connect said operating shaft with the traction means and with said boom raising and lowering means.

6. An excavating and loading machine comprising a truck having traction and steering wheels, a horizontally and vertically swinging boom supported on the truck, a motor, a horizontally arranged operating shaft, mechanism for connecting the motor with the operating shaft, traction means adapted to be connected to the operating shaft, raising and lowering means for the boom adapted for connection with the operating shaft, a single clutch device adapted to alternately connect said operating shaft with the traction means and with said boom raising and lowering means, a locking device for the traction means and operative connections between the locking device and said clutch device arranged to lock the traction means simultaneously with the disconnection of the operating shaft from the traction means.

7. An excavating and loading machine comprising a truck having traction and steering wheels, a horizontally and vertically swinging boom supported on the truck, a motor, a horizontally arranged operating shaft, mechanism for connecting the motor with the operating shaft, traction means adapted to be connected to the operating shaft, raising and lowering means for the boom adapted for connection with the operating shaft and having means to automatically lock the boom in adjusted vertical positions, a single clutch device adapted to alternately connect said operating shaft with the traction means and with said boom raising and lowering means, a locking device for the traction means and operative connections between the locking device and said clutch device arranged to lock the traction means simultaneously with the disconnection of the operating shaft from the traction means.

8. An excavating and loading machine comprising a wheeled truck, a turn table pivoted to the truck, a vertically swinging boom pivoted to the turn table, with means for raising and lowering the same, a motor, a horizontal operating shaft connected by suitable mechanism to the motor, a curved rack on the truck, a vertical drive shaft for the turn table mounted on the turn table and having a pinion meshing with said rack, means for connecting the operating shaft to and disconnecting it from the turn table drive shaft, embracing a clutch device and means connected to said clutch device for locking the turn table from rotation when disconnected from said operating shaft.

9. An excavating and loading machine comprising a wheeled truck, a turn table pivoted to the truck, a vertically swinging boom pivoted to the turn table, with means for raising and lowering the same, a motor, a horizontal operating shaft connected by suitable mechanism to the motor, a curved rack on the truck, a vertical drive shaft for the turn table mounted on the turn table and having a pinion meshing with said rack, means for connecting the operating shaft to and disconnecting it from the turn table drive shaft embracing a clutch device, a vertical lock shaft mounted in the turn table and having a pinion which meshes with said rack, and operative connections between said clutch device and said lock shaft having means to lock the latter from rotation when the clutch device is shifted to release the turn table drive shaft from the operating shaft.

10. An excavating and loading machine comprising a wheeled truck, a turn table pivoted to the truck, a vertically swinging boom pivoted to the turn table, with means for raising and lowering the same, a motor, a horizontal operating shaft connected by suitable mechanism to the motor, a curved rack on the truck, a vertical drive shaft mounted in the turn table and having a pinion meshing with the rack, means for connecting the operating shaft with the turn table drive shaft, embracing a clutch device, a vertical lock shaft mounted in the turn table and having a pinion which meshes with said rack, and provided with a series of spaced notches, and a rock shaft operatively connected with said clutch device to operate the latter and provided with a locking dog to engage the spaced notches of the lock shaft.

In testimony, that I claim the foregoing as my invention I affix my signature in the presence of two witnesses, this 22d day of March A. D. 1911.

GEORGE W. JACKSON.

Witnesses:
RICHARD V. MEGARY,
WILLIAM O. STARK.